United States Patent
Naphade et al.

(10) Patent No.: US 8,214,310 B2
(45) Date of Patent: Jul. 3, 2012

(54) CROSS DESCRIPTOR LEARNING SYSTEM, METHOD AND PROGRAM PRODUCT THEREFOR

(75) Inventors: Milind R. Naphade, Fishkill, NY (US); Rong Yan, Pittsburgh, PA (US)

(73) Assignee: International Business Machines Corporation, Armonk, NY (US)

( * ) Notice: Subject to any disclaimer, the term of this patent is extended or adjusted under 35 U.S.C. 154(b) by 2308 days.

(21) Appl. No.: 11/131,608

(22) Filed: May 18, 2005

(65) Prior Publication Data

US 2007/0005529 A1 Jan. 4, 2007

(51) Int. Cl.
*G06E 1/00* (2006.01)
*G06E 3/00* (2006.01)
*G06F 15/18* (2006.01)
*G06G 7/00* (2006.01)

(52) U.S. Cl. ...................................................... 706/16

(58) Field of Classification Search .................... 706/17, 706/18, 26, 27, 28, 12, 14, 16, 46; 715/500.1, 715/512; 707/104.1, 100, 1–2, 3, 7; 702/20; 704/10, 8, 4, 1; 701/1
See application file for complete search history.

(56) References Cited

U.S. PATENT DOCUMENTS

| | | | |
|---|---|---|---|
| 6,839,682 B1 | 1/2005 | Blume et al. | |
| 2003/1008856 | 5/2003 | Dillon et al. | |
| 2004/1000293 | 1/2004 | Horvitz et al. | |
| 2004/0205482 A1* | 10/2004 | Basu et al. | 715/500.1 |
| 2004/0215657 A1* | 10/2004 | Drucker et al. | 707/104.1 |
| 2004/0221235 A1* | 11/2004 | Marchisio et al. | 715/534 |
| 2005/0021545 A1* | 1/2005 | Lulich et al. | 707/100 |
| 2005/0060308 A1 | 3/2005 | Naphade et al. | |

OTHER PUBLICATIONS

'TRECVID: Beachmarking the effectiveness of information retrieval tasks on digital video': Smeaton, 2003, E. M. Bakker: CIVR 2003 LNCS 2728, pp. 19-27.*
Blum et al., Combining Labeled and Unlabeled Data with Co-training, 1998, Publisher: Proc. of Conference on Computational Learning Theory.
Oded Maron et al., Multiple-Instance Learning for Natural Science Classification, Proc. 15th International Conf. on Machine Learning, 1998, Published in: San Francisco, CA.
Milind R. Naphade et al., Learning to Annotate Video Databases, PRoc. IS&T/SPIE Symp. on Electronic Imaging: Science and Technology, Jan. 2002, Published in: San Jose, CA.
Milind R. Naphade et al., Image Classification using a Set of Labeled and Unlabeled Images, SPIE Photonics East, Internet Multimedia Management Systems, Nov. 1, 2000, pp. 13-24, vol. 4210, Published in: Boston, MA.
Milind R. Naphade et al., Probabilistic Multimedia Objects (Multijects): A Novel Approach to Video Indexing amd Retrieval in Multimedia Systems, Proc. of IEEE International Conference on Image Processing, Oct. 1, 1998, pp. 536-540, vol. 3, Published in: Chicago, IL.
Ratan et al., A Framework for Learning Query Concepts in Image Classification, CVPR, pp. 423-429, 1999.
PCT Notification of Transmittal of the International Search Report and the Written Opinion of the International Searching Authority, or the Declaration, Sep. 25, 2007

* cited by examiner

*Primary Examiner* — Kakali Chaki
*Assistant Examiner* — Peter Coughlan
(74) *Attorney, Agent, or Firm* — Law Office of Charles W. Peterson, Jr.; Louis J. Percello, Esq.

(57) ABSTRACT

A cross descriptor learning system, method and program product therefor. The system extracts descriptors from unlabeled exemplars. For each unlabeled exemplar, a cross predictor uses each descriptor to generate labels for other descriptor. An automatic label generator also generates labels for the same unlabeled exemplars or, optionally, for labeled exemplars. A label predictor results for each descriptor by combining labels from the cross predictor with labels from the automatic label generator.

35 Claims, 6 Drawing Sheets

CROSS DESCRIPTOR LEARNING SYSTEM, METHOD AND PROGRAM PRODUCT THEREFOR

GOVERNMENT RIGHTS

This invention was made with Government support under Contract No.: 2004*H839800*000 awarded by DST/ATP/Contracts. The Government has certain rights in this invention.

FIELD OF THE INVENTION

The present invention generally relates to information management and more particularly, to unstructured information management and automatic metadata enrichment.

BACKGROUND DESCRIPTION

Increasingly, managing unstructured data content and information has required some type of semantic detection and indexing capability. Consequently, typical state of the art content management systems are increasingly relying on machine learning and classification techniques. These state of the art machine learning and classification techniques rely to varying degrees on human intervention to construct the detector (i.e., to teach the system how to classify) prior to use and, sometimes, during use. Also, machine learning and classification techniques may be classified as supervised, semi-supervised or unsupervised. Supervised machine learning and classification begins, for example, by iteratively classifying known examples or labeled exemplars. Semi-supervised machine learning and classification uses both labeled exemplars and unlabeled exemplars. Unsupervised machine learning and classification uses unlabeled exemplars. However, whether supervised or unsupervised, typical such techniques rely on human intervention or feedback to train the classifier to arrive at an acceptable result.

Whether supervised or unsupervised, learning and classification techniques may require considerable supervision as the semantic detector is being constructed, but that may not need a learning component during detection. Well known relevance feedback type techniques may be characterized as non-persistent lightweight binary classifiers that use incremental training to improve classification/retrieval performance. Relevance feedback classifier accuracy depends upon the number of exemplars provided, the level of feedback the classifier receives and the amount of time expended training. Statistical semantic modeling, for example, has significantly reduced the level of manual supervision needed over older relevance feedback techniques from lightweight classifiers to heavyweight classifiers. Unfortunately, with these prior art techniques training the classifier can be a time consuming and expensive proposition. So, these techniques consume large amounts of precious annotation time and require a considerable annotation effort during training to achieve acceptable annotation quality. As a result, it has become increasingly important to reduce human intervention in machine learning and classification, especially for state of the art media indexing and retrieval.

Consequently, to reduce human intervention time, disambiguation has been widely applied during annotation. Further, active learning with the system taking a pro-active role in selecting samples during annotation has maximized disambiguation and reduced the number of samples that need to be annotated by an order of magnitude. See, e.g., M. Naphade et al., "Learning to Annotate Video Databases," *Proc. IS&T/SPIE Symp. on Electronic Imaging: Science and Technology—Storage & Retrieval for Image and Video Databases X*, San Jose, Calif., January, 2002). An orthogonal approach for concepts with regional support, known as multiple instance learning, accepts annotations at coarser granularity. For example, a user can build a model for a regional concept (e.g., the sky) by selecting the region in an image that corresponds to the regional label. Once the regional concepts have been selected, the system learns from several possible positively and negatively annotated examples, how to represent the concept using regional features. See, e.g., A. L. Ratan, O. Maron, W. E. L. Grimson, and T. Lozano Prez. *A framework for learning query concepts in image classification*. In CVPR, pp. 423-429, 1999.

Other useful tools include cross descriptor learning with multimodal semantic concept detection. See, e.g., Naphade et al, "Probabilistic Multimedia Objects (Multijects): A Novel approach to Indexing and Retrieval in Multimedia Systems," *Proceedings of IEEE International Conference on Image Processing*, vol. 3, pp 536-540, October 1998, Chicago, Ill. For a semi-supervised example, where unlabeled exemplars are used in conjunction with labeled exemplars for classification, see, Naphade et al, "Classification using a Set of Labeled and Unlabeled Images," SPIE Photonics East, Internet Multimedia Management Systems, vol. 4210, pp 13-24, Boston, Mass., November 2000. Also, unlabeled exemplars with multiple descriptors have been used with labeled exemplars in what is known as single view sufficiency. Single view sufficiency is useful when each descriptor is sufficient by itself for learning and to represent the metadata model. See, e.g., Blum et al, "Combining labeled and unlabeled data with co-training," *Proceedings of Conference on Computational Learning Theory*, pp 92-100, 1998. Unfortunately, single view sufficiency requires making simplistic and unrealistic assumptions, i.e., that each descriptor in itself sufficiently represents the metadata and that all descriptors agree with each other in terms of the metadata characteristics. Descriptors for unstructured data (such as for reality based exemplars that support multiple descriptors, e.g., video, text, images and etc.) seldom satisfy single view sufficiency requirements. So, because of the constraints imposed by single view sufficiency, it has not been particularly useful on unstructured data and information. Consequently, these approaches all require some manual intervention in enriching metadata in the unlabeled exemplars, even for unlabeled exemplars that can be described using multiple descriptors.

Thus, there is a need for a system and method that is unconstrained by the restrictions of single view sufficiency and independent of the apparatus used for generating initial labels over the unlabeled exemplars and further, for a system and method for developing cross feature learning on unlabeled exemplars.

SUMMARY OF THE INVENTION

It is a purpose of the invention to facilitate unstructured data content and information management;

It is another purpose of the invention to relax single descriptor view sufficiency requirements in content management systems;

It is yet another purpose of the invention to automatically label unlabeled predictors without manually annotating any of the unstructured data;

It is yet another purpose of the invention to automatically characterize and label unstructured information;

It is yet another purpose of the invention to provide cross feature learning on unlabeled exemplars unconstrained by the restrictions of single view sufficiency and independent of the apparatus used for generating both the initial labels and the unlabeled exemplars.

The present invention relates to a cross descriptor learning system, method and program product therefor. The system extracts descriptors from unlabeled exemplars. For each unlabeled exemplar, a cross predictor uses each descriptor to generate labels for other descriptor. An automatic label generator also generates labels for the same unlabeled exemplars or, optionally, for labeled exemplars. A label predictor results for each descriptor by combining labels from the cross predictor with labels from the automatic label generator.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1:
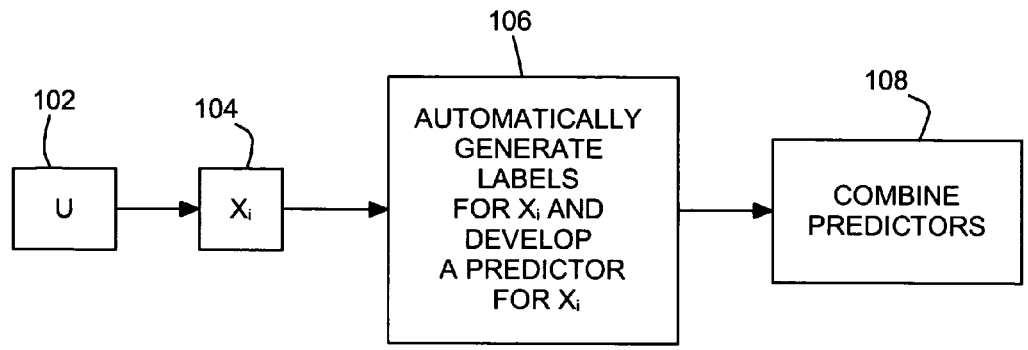
FIG. 1 shows a flow diagram example of cross descriptor learning steps according to a preferred embodiment of the present invention.

Turning now to the drawings, and more particularly FIG. 1 shows a flow diagram example of cross descriptor learning steps 100 on a set (U) of unlabeled exemplars 102 according to a preferred embodiment of the present invention. Application of the cross descriptor learning steps 100 facilitates automatic metadata generation for unlabeled, unstructured data as well as refining the metadata based on exemplars in the unlabeled, unstructured data and representations of the exemplars by multiple descriptors. Further, cross descriptor learning according to the present invention has application to managing unstructured information encountered in numerous applications including search, federation across multiple search engines, automatic metadata enrichment of unstructured data of different modalities. Such unstructured data may include, for example only, text, audio, image, video, sensors, etc.

Cross descriptor learning begins in step 104 by creating learning representations for the unlabeled exemplars 102 by extracting as many as N descriptors (X) for each unlabeled exemplar, where N is at least 2 and i ranges from 1 to N. For each unlabeled exemplar each descriptor is used in step 106 with other descriptors to automatically generate label predictors for some or all of the other N−1 descriptors. Finally, in step 108 the predictors developed for the descriptors are combined to generate labels and corresponding confidences for all of the unlabeled exemplars 102. Thus, using labels for descriptors for other exemplars much more robustly refines the resulting predictors.

Accordingly, unlabeled exemplars are selected from unstructured information 102 and descriptors are determined 104 for the unlabeled exemplars. Each descriptor is used to automatically generate 106 labels for other ones of the unlabeled exemplars. So, by generating a label for each descriptor using some or all of the other descriptors, effectively, the unlabeled exemplars 102 serves as a source of N sets of up to N−1 descriptors. Each label is automatically generated from one of the N sets and a predictor is generated from each label. Labels may be automatically generated, for example, by a label generation unit using each descriptor for generating labels for some or all of the other descriptors. So for example with N=4, an audio descriptor, image descriptor, and text descriptor may be combined for one unlabeled exemplar to automatically generate a video descriptor predictor; the same audio descriptor and text descriptor may be combined with a video descriptor for the unlabeled exemplar to automatically generate a image descriptor predictor; the audio descriptor and image descriptor may be combined with the video descriptor to automatically generate a text descriptor predictor; and the text descriptor and image descriptor may be combined with the video descriptor to automatically generate a audio descriptor predictor. Thus, the automatically generated label predictor for any descriptor is generated with confidences based on the processing of any other descriptor or combination of descriptors, excluding the descriptor itself. This leverages the information in metadata available in the descriptors that might otherwise insufficiently describe the exemplar. A predictor is developed for each descriptor from these automatically generated labels.

In another example, the unlabeled exemplars may be provided to a predictor or predictor service, e.g., Yahoo® Search and Google™ Search, to automatically generate the labels. Alternately, a separate set of labeled exemplars may be provided and used to automatically generate labels and predictors for the unlabeled exemplars. Regardless of how the labels are automatically generated, labels for each descriptor are used to develop predictors for other descriptors. Once predictors have been generated for each available descriptor, the predictors are combined for each descriptor 108 to generate a new set of predictors for the unlabeled exemplars.

Figure 2:
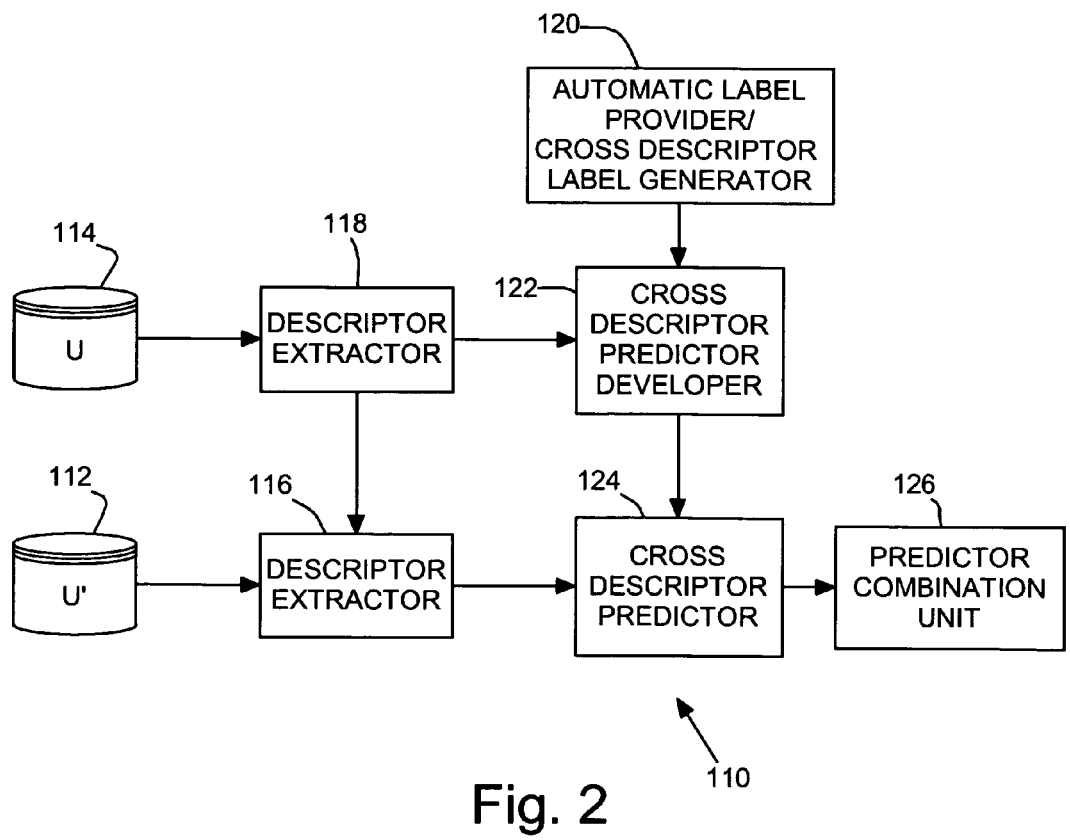
FIG. 2 shows an example of a preferred embodiment cross descriptor learning system for characterizing unlabeled exemplars according to the present invention.

FIG. 2 shows an example of a preferred embodiment cross descriptor learning system 110 for generating and combining descriptors according to the present invention, e.g., according to the cross descriptor learning steps 100 of FIG. 1. In this example distinct unlabeled exemplar sets 112, 114 are provided to the system 110, e.g., cached locally in local storage. The system 110, which may be embodied in computer usable medium provided to one or more computers, uses one set 112 to build predictors for the other set 114 and to automatically label resulting descriptors from the second set 114. Descriptor extraction units 116, 118 extract identical sets of corresponding descriptors for each unlabeled exemplar set 112, 114. A label generation unit 120 automatically generates labels for all of the N extracted descriptors for each unlabeled exemplar. The label generation unit 120 uses each descriptor from descriptor extraction unit 118 to automatically generate labels for other ones of the N generated descriptors for each unlabeled exemplar. So, the labels generated for the descriptors for one exemplar are generated partially independent of the labels for other descriptors. A cross descriptor predictor development (or generation) unit 122 generates a predictor for each of the descriptors from the labels. A cross descriptor prediction unit 124 assigns a label to each of the descriptors based on the predictor from the cross descriptor predictor development unit 122. A predictor combination unit 126 combines the assigned labels for a more refined result.

Figure 3:
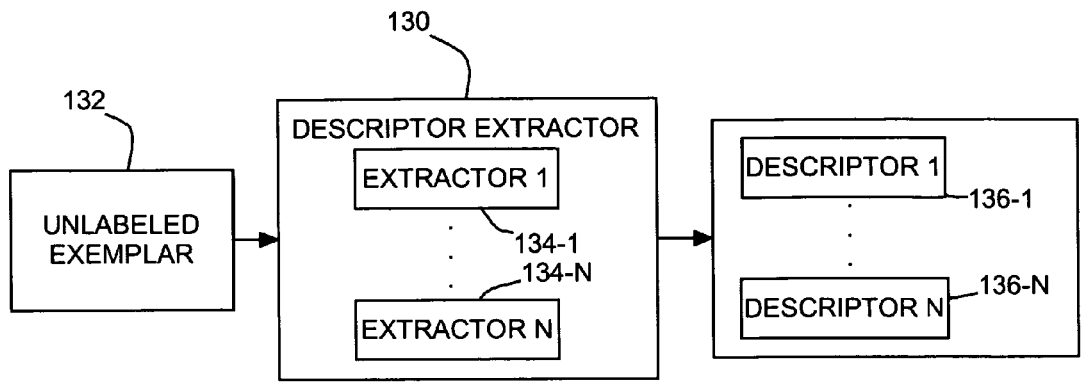
FIG. 3 shows an example of a descriptor extraction unit for extracting descriptors from unlabeled exemplars.

FIG. 3 shows an example of a descriptor extraction unit 130, e.g., units 116, 118 in FIG. 2, for extracting descriptors from exemplars 132, e.g., from unlabeled exemplar sets 112, 114. The descriptor extraction unit 130 includes a bank of descriptor extractors 134-1, ..., 134-N operating in parallel to extract descriptors 136-1, ..., 136-N from each of the individual unlabeled exemplars 132. Preferably, the generated descriptors 136-1, ..., 136-N include image descriptors, audio descriptors, text descriptors and video characteristic descriptors, e.g., color, texture, shape, frequency and etc.

Figure 4:
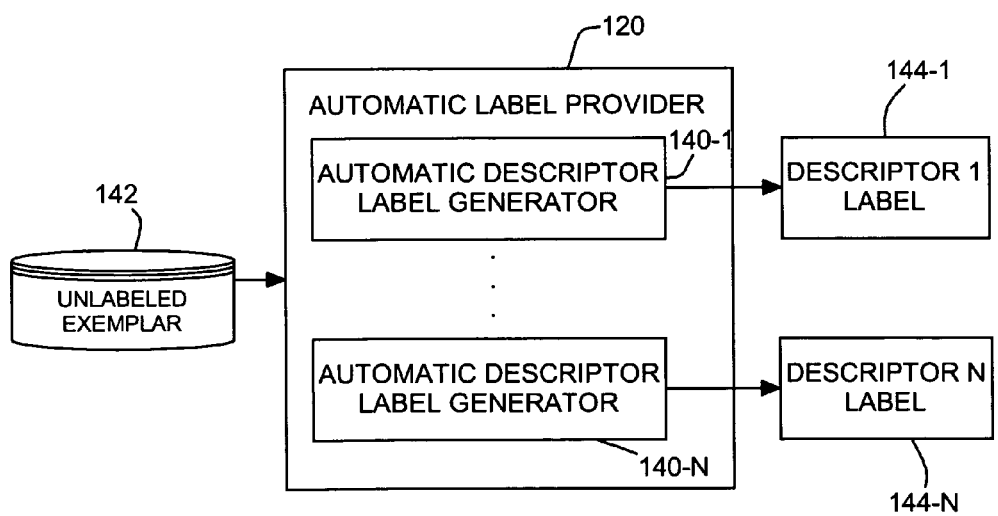
FIG. 4 shows an example of a label generation unit with a bank of N label generators.

FIG. 4 shows an example of a label generation unit 120 that automatically generates cross descriptor labels. In this example, the label generation unit 120 includes a bank of N label generators 140-1, ..., 140-N, one for each of the N descriptors. Each unlabeled exemplars 142 is passed to label generators 140-1, ..., 140-N. Each label generator 140-1, ..., 140-N automatically generates a corresponding label 144-1, ..., 144-N for each descriptor based on descriptor analysis of the N−1 other descriptors, i.e., the N−1 descriptors excluding the current descriptor that the particular label generator is labeling. It should be noted that, primarily, each label generator 140-1, ..., 140-N automatically generates labels without any human intervention, at least during generation.

So, for example, an audio descriptor and a video descriptor may be extracted from an unlabeled exemplar. The label generation unit 120 generates a label for the audio descriptor based on the analysis of the visual descriptor and vice-versa. Each label may include, for example, a character string and a numerical measure. The numerical measure may quantitatively represent the likelihood of the object represented by the character string being present in the visual exemplar. An "Airplane" label, for example, may be associated with detection confidences of 0.1 and 0.9 from the visual descriptor and the audio descriptor, respectively.

Figure 5:
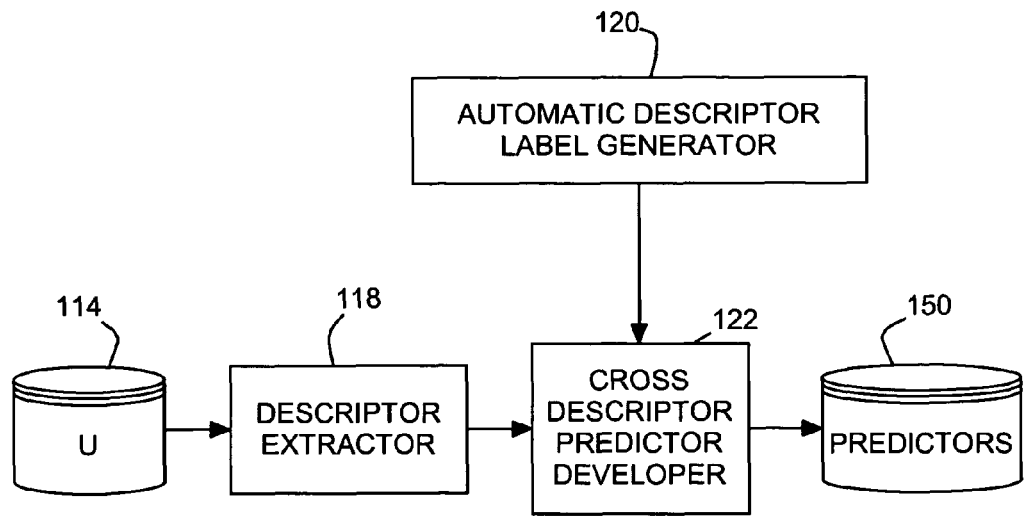
FIG. 5 shows an example of developing persistent predictors from unlabeled exemplars.

FIG. 5 shows an example of developing persistent predictors 150 from unlabeled exemplars 114, substantially as described for FIG. 2 with like elements labeled identically. In this example a single unlabeled exemplar set 112 is passed to a single descriptor extraction unit 118 that extracts a set of N descriptors for each unlabeled exemplar in the set 114. Again, the label generation unit 120 automatically generates labels for each of the N descriptors from the remaining N−1 descriptors. The cross descriptor predictor development (or generation) unit 122 uses the N descriptors to generate a predictor for each. The resulting N predictors are stored 150 as persistent predictors that, subsequently, are used for prediction, e.g., over the current set 114 or other sets of unlabeled exemplars.

Figure 6:
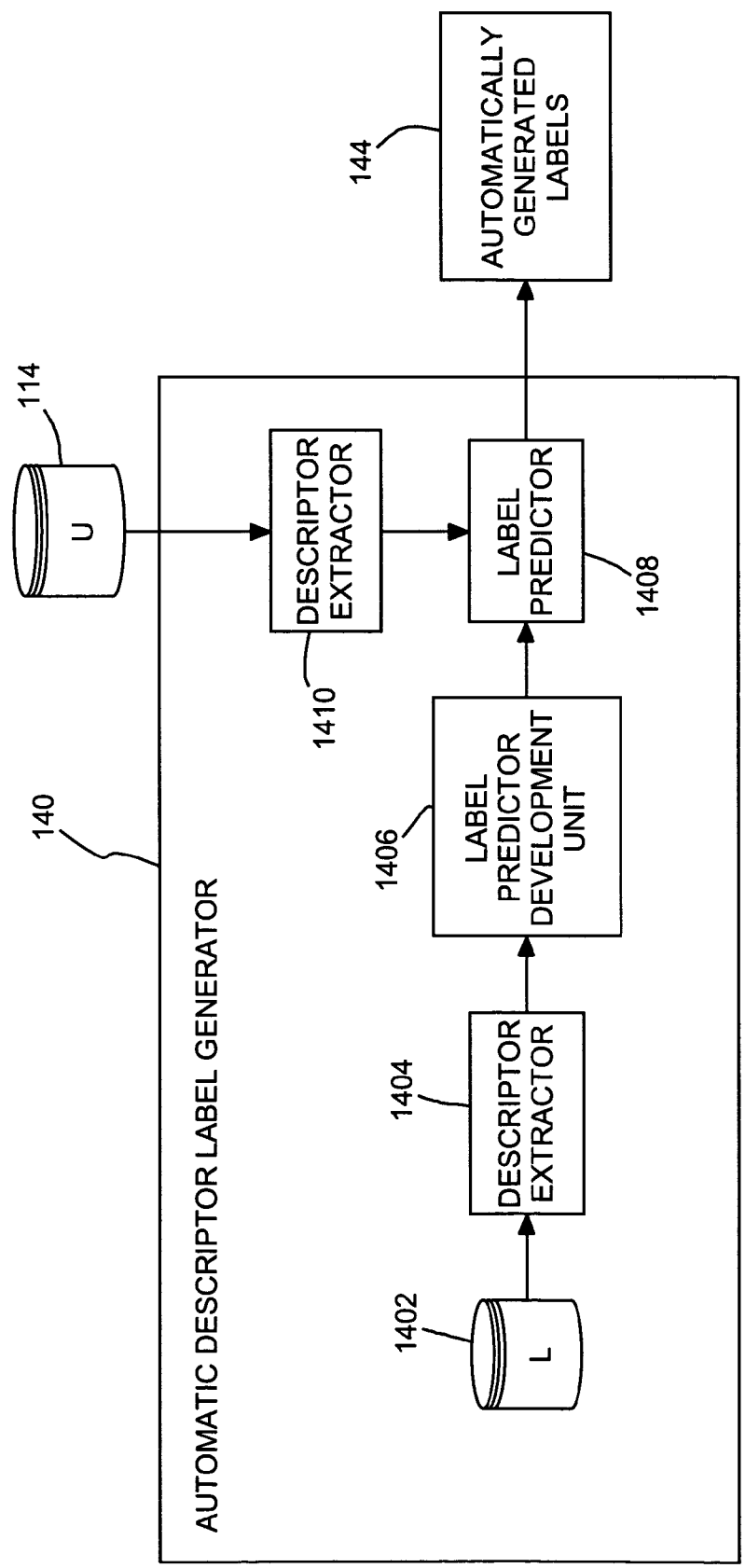
FIG. 6 shows an example of an automatic label generator.

FIG. 6 shows an example of an automatic label generator 140, e.g., one of 140-1, ..., 140-N in FIG. 4. In this example, the label generator 140 includes a set of L manually labeled exemplars 1402. A descriptor extraction unit 1404, that is substantially identical to descriptor extractors 134-1, ..., 134-N in FIG. 3, extracts the appropriate descriptors from all the labeled exemplars 1402. A label predictor development unit 1406 generates a label prediction unit 1408 based on the descriptors provided by the descriptor extraction unit 1404. The label prediction unit 1408 operates on descriptors received from another descriptor extraction unit 1410, e.g., substantially similar to one of descriptor extractors 134-1, ..., 134-N. So, the particular unlabeled exemplar from set 142 is passed to descriptor extraction unit 1410. Descriptor extraction unit 1410 extracts a descriptor and passes the extracted descriptor to label prediction unit 1408, which automatically generates a label 144 for the descriptor. Preferably, the descriptor extraction unit 1410 extracts the exact same descriptor that was used for developing the label prediction unit 1406. Extracted descriptors are presented to the label prediction unit 1408, which generates labels 144 that may include a text string and a numeric measure of the likelihood of observing the label (represented by the text) in the unlabeled exemplar 142.

Figure 7:
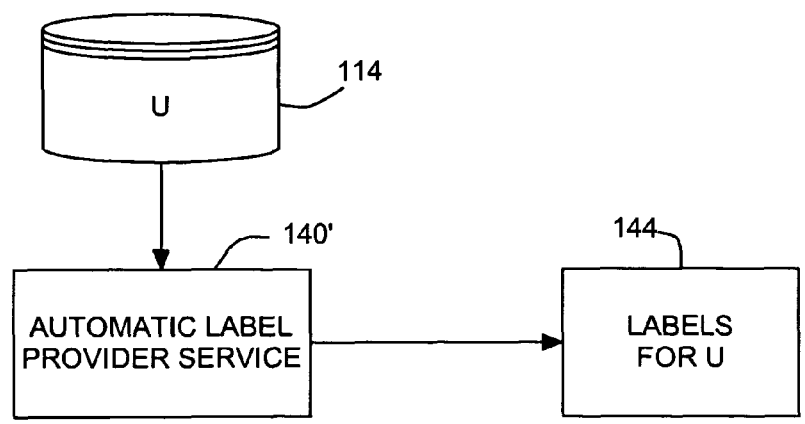
FIG. 7 shows an example wherein a set of labeled exemplars are generated from the unlabeled exemplars using a label generation service.

FIG. 7 shows an example of an automatic label generator 140', in this example a service that accepts an unlabeled exemplar 142 and automatically generates labels 144. Suitable labeling services include any typical state of the art search engine, e.g., Google™ Search. When the system presents an unlabeled exemplar to a label provider service 140', the service 140' provides a list and ranking of labels for the unlabeled exemplar. Such labels can be supplied directly by the service provider to the cross descriptor predictor development unit 122 in FIG. 2.

Figure 8:
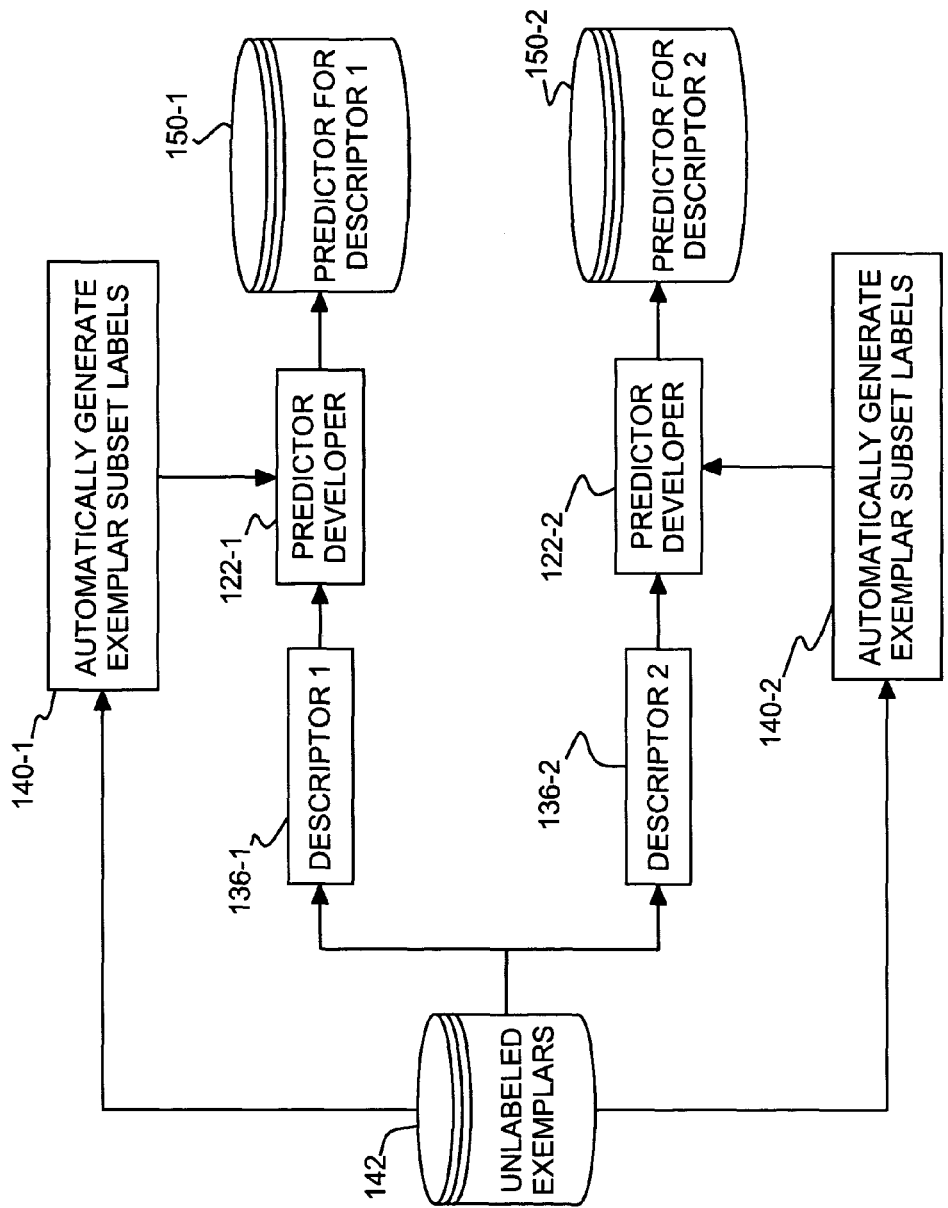
FIG. 8 shows an example of cross descriptor construction data flow to automatically generate labels in a preferred embodiment cross descriptor prediction unit.

FIG. 8 shows an example of data flow in automatically generating labels for N=2 using a preferred embodiment cross descriptor prediction unit, e.g., 122 in FIG. 2. Pairs of descriptors 136-1, 136-2 are extracted from unlabeled exemplars 142 by a pair of descriptor extractors, e.g., 134-1, ..., 134-N of FIG. 3. Simultaneously, a pair of automatic label generators 140-1, 140-2 (e.g., 144-1, ..., 144-N in FIG. 4) generate labels from a subset of the unlabeled exemplars 142. The extracted descriptors 136-1, 136-2 and corresponding automatically generated labels are each passed to a predictor developer 122-1, 122-2, e.g., in cross descriptor predictor developer 122 in FIG. 2. Each predictor developer 122-1, 122-2 provides a cross-trained label predictor 150-1, 150-2 (e.g., in predictors 150 in FIG. 5) for the particular descriptor 136-1, 136-2 with all predictors 150-1, 150-2 being created in parallel (e.g., in a batch submission) or sequentially.

Figure 9:
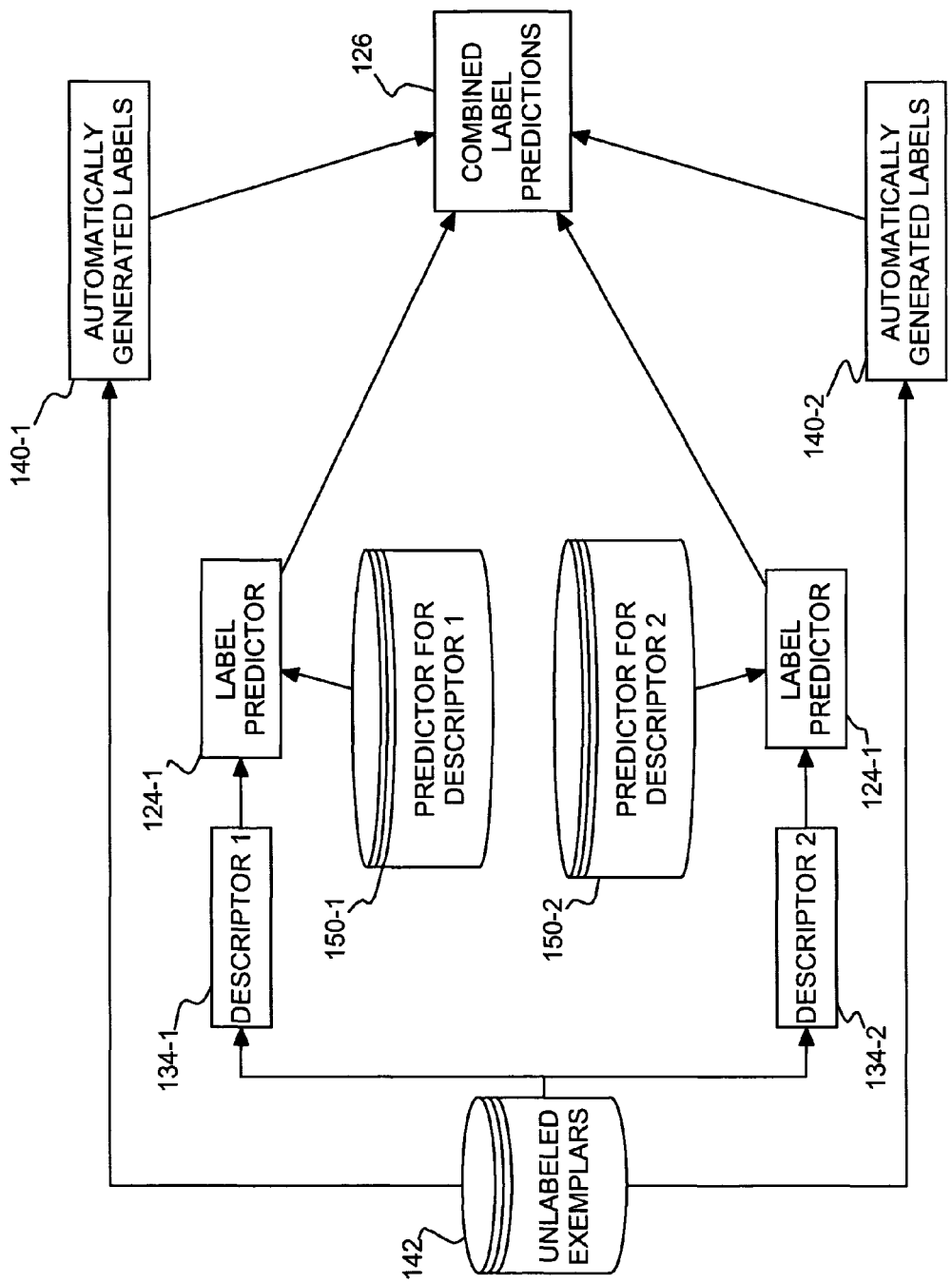
FIG. 9 shows an example of a preferred cross descriptor predictor development unit that receives predictors generated by the cross descriptor predictor.

FIG. 9 shows a minimum descriptor size example (again, N=2) of a preferred cross descriptor predictor development data flow on a pair of predictors 150-1, 150-2 in this example, generated by the cross descriptor predictor, e.g., 122 in FIG. 5. Again, pairs of descriptors 136-1, 136-2 are extracted from unlabeled exemplars 142 in a pair of descriptor extractors, e.g., 134-1, ..., 134-N of FIG. 3. Also in this example, a pair of label generators 140-1, 140-2 automatically generate labels (e.g., 144-1, ..., 144-N in FIG. 4) for all of the unlabeled exemplars 142. The extracted descriptors 136-1, 136-2 and predictors 150-1, 150-2 are each passed to a corresponding label predictor 124-1, 124-2, e.g., in the cross descriptor prediction unit 124 in FIG. 2. The predictor combination unit 126 combines the predicted labels from label predictors 124-1, 124-2 with the automatically generated labels from label generators 140-1, 140-2 to refine the prediction result. It should be noted that, although shown for labeling exemplars with 2 descriptors in this example and the above examples, this is for a minimum example only and not intended as a limitation. The present examples are easily expanded to apply to exemplars with any number of descriptors.

Continuing this example, as the cross descriptor predictor development unit 124 is presented with unlabeled exemplars 142, descriptors (e.g., 134-1, ..., 134-N) are extracted from each of the unlabeled exemplars 142. The descriptors are passed to the label predictors 124-1, 124-2, which label the descriptors based on the respective predictor 150-1, 150-2. Simultaneously, the label generators 140-1, 140-2 automatically generate labels (e.g., 144-1, ..., 144-N) from remaining unlabeled exemplars 142 exclusive of the exemplar corresponding to the particular extracted descriptor 136-1, 136-2. The predictor combination unit 126 combines the predicted labels from label predictors 124-1, 124-2 with the automatically generated labels from label generators 140-1, 140-2 to refine the prediction result.

Advantageously, a preferred embodiment system provides cross descriptor learning to leverage unlabeled exemplars using multiple descriptors, where each individual descriptor may be insufficient in and of itself to describe a metadata model for any one of the unlabeled exemplars. Further, for unstructured information management, where only the unlabeled exemplars are available to a preferred embodiment system, the exemplars may still be labeled automatically. Also the present invention is not hampered by strict requirements for single descriptor views and, further, supports multiple descriptor views. So, a system constructed according to a preferred embodiment of the present invention automatically creates metadata from unstructured information over multiple descriptors, even without prior manual annotation of the unstructured data.

Additionally, a preferred embodiment system provides a pseudo-federated search within a single system to automatically generate a set of labeled exemplars from the unlabeled exemplars. Optionally, labels may be generated using any well known search engine, such as Yahoo® Search and Google™ Search, to rank search results with text and hyperlinks. Thereafter, the system may build descriptors for the same unlabeled descriptors guided by the search results for a pseudo-federated search. So, an annotator for automatically labeling unlabeled exemplars according to the present invention may be built from the unlabeled exemplars, from a separate set of labeled exemplars or from the labels generated for the unlabeled exemplars. Thus, unlike prior techniques that required sets of labeled exemplars for any refinement over unlabeled exemplars, a preferred embodiment machine learning system can generate refined labels just from the unlabeled exemplars alone.

While the invention has been described in terms of preferred embodiments, those skilled in the art will recognize that the invention can be practiced with modification within the spirit and scope of the appended claims. It is intended that all such variations and modifications fall within the scope of the appended claims.

What is claimed is:

1. A method of cross descriptor learning using unlabeled exemplars, said method comprising of the steps of:
    a) extracting descriptors for each of a plurality of unlabeled exemplars, each extracted descriptor being a representation of a corresponding one of said plurality of unlabeled exemplars;
    b) automatically generating labels from said each extracted descriptor, said each extracted descriptor being used to automatically generate labels for other ones of said descriptors;
    c) developing a predictor for said each extracted descriptor from generated said labels; and
    d) combining predictions across predictors, labels being generated from combined said predictions for each of said unlabeled exemplars.

2. A method as in claim 1, wherein the step (b) of automatically generating labels comprises providing said unlabeled exemplars to a label provider service.

3. A method as in claim 2, wherein said cross descriptor learning is performed as a search and wherein the label provider service provides one of a plurality of search engines.

4. A method as in claim 1, before the step (d) of combining further comprising:
    d1) providing corresponding manually labeled exemplars, wherein said predictors being used to automatically generate said labels for said each descriptor are generated learning representations of any singularity or a plurality of said other ones of said descriptors with ones of said corresponding manually labeled exemplars.

5. A method as in claim 1, wherein predictions are automatically combined in the step (d) of combining predictions.

6. A method as in claim 1, wherein predictions are combined in step (d) responsive to statistical learning.

7. A method as in claim 6, wherein statistical learning comprises discriminant learning.

8. A method as in claim 7, wherein said statistical learning comprises a support vector machine learning.

9. A method as in claim 1, wherein the unlabeled exemplars are unstructured information comprising images, audio, text and video.

10. A method as in claim 1, wherein each of said labels include corresponding confidences quantitatively indicating the likelihood of an object represented by a label being present in corresponding unlabeled exemplar and classifying corresponding said unlabeled exemplars.

11. A method as in claim 10, wherein said labels and corresponding confidences rank said unlabeled exemplars.

12. A method as in claim 10, wherein ones of said confidences are binary indicators indicating the presence or absence of each label in a corresponding exemplar.

13. A method as in claim 10, wherein ones of said confidences are real values, each real value indicating the presence or absence of each label in a corresponding exemplar.

14. A cross descriptor learning system comprising:
    storage storing a plurality of unlabeled exemplars;
    a descriptor extraction unit extracting descriptors from said unlabeled exemplars;
    an automatic descriptor labeler generating labels for each extracted descriptor from other extracted said descriptors;
    a cross descriptor predictor predicting labels for said each extracted descriptor from said each extracted descriptor and labels generated for each extracted descriptor; and
    a label combination unit combining labels for said each extracted descriptor from said cross descriptor predictor with labels from said automatic descriptor labeler, each one of the combined said labels being applied to a corresponding unlabeled exemplar.

15. A cross descriptor learning system as in claim 14, wherein said descriptor extraction unit comprises a plurality of descriptor extractors.

16. A cross descriptor learning system as in claim 15, wherein said plurality of descriptor extractors comprises an image descriptor extractor, an audio descriptor extractor, a text descriptor extractor and at least one video characteristic descriptor extractor.

17. A cross descriptor learning system as in claim 16, wherein at least one video characteristic descriptor extractor comprises, a color extractor, texture, a shape extractor, and a frequency extractor.

18. A cross descriptor learning system as in claim 15, wherein said automatic descriptor labeler is one of a plurality of automatic descriptor labelers each generating labels for descriptors extracted from a corresponding one of said plurality of descriptor extractors.

19. A cross descriptor learning sysm as in claim 18, wherein said cross descriptor predictor comprises a plurality of descriptor label predictors.

20. A cross descriptor learning system as in claim 14, wherein said automatic descriptor labeler comprises a descriptor labeling service.

21. A cross descriptor learning system as in claim 14, wherein said automatic descriptor labeler comprises:
storage storing a plurality of labeled exemplars;
an extractor extracting descriptors from said labeled exemplars; and
a label predictor developer developing a label predictor from extracted said descriptors from said plurality of labeled exemplars, said descriptors extracted from said unlabeled descriptors being automatically labeled by one said label predictor.

22. A computer-readable medium being non-transitory and having stored thereon a plurality of instructions, the plurality of instructions including instructions that, when executed by a processor, cause the processor to:
a) extract descriptors for each of a plurality of unlabeled exemplars, each extracted descriptor being a representation of a corresponding one of said plurality of unlabeled exemplars;
b) automatically generate labels from said each extracted descriptor, said each extracted descriptor being used to automatically generate labels for other ones of said descriptors;
c) develop a predictor for said each extracted descriptor from generated said labels; and
d) combine predictions across predictors, labels being generated from combined said predictions for each of said unlabeled exemplars.

23. A computer-readable medium as in claim 22, wherein the step (b) of automatically generating labels causes the processor to provide said unlabeled exemplars to a label provider service.

24. A computer-readable medium as in claim 22, before the step (d) of combining further causing the processor to:
d1) extract descriptors from manually labeled exemplars;
d2) generate learning representations from descriptors extracted in step (d1);
d3) generate a label prediction device for each descriptor using said manually labeled exemplars and said descriptors extracted from said manually labeled exemplars; and
d4) generate labels for plurality of unlabeled exemplars.

25. A computer-readable medium as in claim 24, wherein the step (d4) of generating labels further causes the processor to:
i) extract descriptors from manually labeled exemplars; and
ii) present each extracted one of said descriptors to a corresponding developed said predictor, said corresponding developed predictor predicting a label for said each extracted one.

26. A computer-readable medium as in claim 22, wherein the step (d) of combining predictions causes the processor to automatically combine predictions responsive to statistical learning.

27. A computer-readable medium as in claim 26, causing the processor to use discriminant learning for said statistical learning.

28. A computer-readable medium as in claim 26, wherein the step (d) causes the processor to act as a support vector machine during said statistical learning.

29. A computer-readable medium as in claim 22, wherein said labels generated by the processor in step (d) include corresponding confidences quantitatively indicating the likelihood of an object represented by a label being present in corresponding unlabeled exemplar and, further, classifying corresponding said unlabeled exemplars.

30. A computer program product for cross descriptor learning, said computer program product comprising a non-transitory computer usable medium having computer readable program code stored thereon, said computer readable program code comprising:
computer readable program code for selecting each of a plurality of unlabeled exemplars;
computer readable program code for extracting descriptors from each selected one of said unlabeled exemplars;
computer readable program code for automatically generating labels for each extracted descriptor from other extracted said descriptors;
computer readable program code for predicting labels for said each extracted descriptor from said each extracted descriptor and labels generated for each extracted descriptor; and
computer readable program code for combining predicted said labels from said computer readable program code for predicting labels with automatically generated said labels for said each extracted descriptor, each one of the combined said labels being applied to a corresponding unlabeled exemplar.

31. A computer program product as in claim 30, wherein said computer readable program code for extracting descriptors comprises:
computer readable program code for image descriptor extraction;
computer readable program code for audio descriptor extraction;
computer readable program code for text descriptor extraction; and
computer readable program code for video characteristic descriptor extraction.

32. A computer program product as in claim 31, wherein said computer readable program code for video characteristic descriptor extraction comprises:
computer readable program code for color extraction;
computer readable program code for texture extraction;
computer readable program code for shape extraction; and
computer readable program code for frequency extraction.

33. A computer program product as in claim 30, wherein said computer readable program code for automatically generating labels comprises computer readable program code for contacting a descriptor labeling service.

34. A computer program product as in claim 30, wherein said computer readable program code for automatically generating labels comprises:
computer readable program code for storing plurality of labeled exemplars;
computer readable program code for extracting descriptors from said labeled exemplars; and
computer readable program code for developing a label predictor from extracted said descriptors from said plurality of labeled exemplars, said descriptors extracted from said unlabeled descriptors being automatically labeled by one said label predictor.

35. A computer program product as in claim 30, further comprising: computer readable program code for generating corresponding confidences with each label, generated said corresponding confidences quantitatively indicating the likelihood of an object represented by said each label being present in corresponding unlabeled exemplar and, further, classifying corresponding said unlabeled exemplars.

* * * * *